United States Patent
Gill et al.

(10) Patent No.: US 9,175,405 B2
(45) Date of Patent: Nov. 3, 2015

(54) CORROSION CONTROL COMPOSITIONS AND METHODS OF MITIGATING CORROSION

(71) Applicant: ECOLAB USA INC., Naperville, IL (US)

(72) Inventors: Jasbir S. Gill, Naperville, IL (US); Danilo Zim, Compinas-SP (BR); Matheus Paschoalino, Compinas-SP (BR)

(73) Assignee: Ecolab USA Inc., St. Paul, MN (US)

( * ) Notice: Subject to any disclaimer, the term of this patent is extended or adjusted under 35 U.S.C. 154(b) by 354 days.

(21) Appl. No.: 13/839,721

(22) Filed: Mar. 15, 2013

(65) Prior Publication Data

US 2014/0272133 A1    Sep. 18, 2014

(51) Int. Cl.
| | |
|---|---|
| *C23F 11/08* | (2006.01) |
| *B05D 7/22* | (2006.01) |
| *C09D 5/08* | (2006.01) |
| *C23F 11/167* | (2006.01) |
| *C23F 11/18* | (2006.01) |

(52) U.S. Cl.
CPC ............... *C23F 11/1676* (2013.01); *B05D 7/22* (2013.01); *C09D 5/08* (2013.01); *C23F 11/08* (2013.01); *C23F 11/188* (2013.01)

(58) Field of Classification Search
None
See application file for complete search history.

(56) References Cited

U.S. PATENT DOCUMENTS

| | | | | |
|---|---|---|---|---|
| 4,689,200 | A | * | 8/1987 | Cook et al. ................... 422/15 |
| 4,964,468 | A | | 10/1990 | Adams et al. |
| 5,229,030 | A | * | 7/1993 | Clubley et al. ........... 252/389.23 |
| 5,294,371 | A | * | 3/1994 | Clubley et al. ........... 252/389.23 |
| 6,083,308 | A | * | 7/2000 | Fletcher ..................... 106/14.12 |
| 7,291,217 | B2 | * | 11/2007 | Phelps et al. ................. 106/480 |
| 2003/0230742 | A1 | * | 12/2003 | Trahan et al. ................ 252/387 |
| 2004/0011252 | A1 | * | 1/2004 | Sturgill et al. ................ 106/401 |
| 2008/0308770 | A1 | | 12/2008 | Tiwari |
| 2011/0071060 | A1 | | 3/2011 | Nguyen |
| 2012/0149608 | A1 | | 6/2012 | Meyer et al. |

* cited by examiner

*Primary Examiner* — William Phillip Fletcher, III
(74) *Attorney, Agent, or Firm* — Brinks Gilson & Lione; Eric D. Babych

(57) ABSTRACT

Corrosion inhibitor compositions are provided that can include a mixture of one or more transition metals, one or more organic phosphates, one or more inorganic phosphates, optionally a dispersant, and hydroxyphosphono acetic acid and/or salts thereof. Methods of mitigating or inhibiting corrosion of housing or conduits containing aqueous mediums are also disclosed. The methods can include the steps of pretreating the metal conduit with a mixture of one or more transition metals, one or more organic phosphates, one or more inorganic phosphates, and hydroxyphosphono acetic acid, introducing an aqueous medium into the metal conduit, and injecting a mixture of one or more transition metals, one or more organic phosphates, one or more inorganic phosphates, and hydroxyphosphono acetic acid and/or salts thereof into the aqueous medium.

8 Claims, 8 Drawing Sheets

CORROSION CONTROL COMPOSITIONS AND METHODS OF MITIGATING CORROSION

CROSS-REFERENCE TO RELATED APPLICATIONS

Not Applicable

FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

The disclosure pertains to compositions and methods useful for controlling corrosion. In particular, the disclosure pertains to corrosion control compositions and methods of mitigating corrosion of metals in corrosive aqueous systems.

2. Description of the Related Art

Corrosion of metal surfaces in aqueous media has long been a problem for industries such as the oil and gas industry, food/beverage industry, and wash/sanitizing industry. For example, it is well known that during the production of oil and gas several other corrosive components are present such as brines, organic acids, carbon dioxide, hydrogen sulfide, and microorganisms. These aggressive constituents can cause severe corrosion as evidenced by surface pitting, embrittlement, and general loss of metal. The metallic surfaces can be composed of high alloy steels including chrome steels, ferritic alloy steels, austenitic stainless steels, precipitation-hardened stainless steels, and high nickel content steels, but most often the less expensive carbon steels are utilized in combination with corrosion inhibitors or coatings. This problem is even more troublesome in deep-sea operations where replacement of corroded equipment is difficult and costly.

Sea water is a highly corrosive media. When sea water is brought into contact with various metals, such as during transportation of the sea water in metal pipelines, corrosion of the metal can occur. The use of oxygen scavengers has been suggested as a way to successfully prevent corrosion in pipelines exposed to sea water. Despite the relative effectiveness, this solution has two main drawbacks. First, it demands the construction of a degasification unity at each pumping station, which will represent a high initial investment. Second, the solution requires large amounts of chemicals since it is necessary to completely neutralize the entire amount of oxygen dissolved in the water each time it passes through a pumping station considering that these operations are carried out at open air. Although attempts have been made to reduce or prohibit corrosion in metals exposed to sea water, it remains extremely challenging to control the corrosion of metal surfaces contacting such highly corrosive media.

In the food/beverage and wash/sanitizing industry, solutions such as sodium hypochlorite solutions are commonly used and are highly effective as bleaches and sanitizers for cleaning a variety of surfaces. However, sodium hypochlorite solutions are corrosive to many treated surfaces, in particular, metal surfaces become highly corroded.

There are several mechanisms responsible for corrosion of metals. In corrosive water systems, the overall corrosion rate is controlled by the reduction of oxygen inhibiting the cathodic reaction. However, the most robust and cost effective water treatment programs include both anodic and cathodic inhibitors to block reactions at both the anode and the cathode.

Anodic inhibitors suppress the rate of metal ions being transferred into the aqueous environment while cathodic inhibitors act through the development of a barrier film that reduces the ability of oxygen to diffuse to the metal surface.

Despite the availability of a variety of corrosion inhibitors, there still exists a need for improved compounds and methods for providing corrosion inhibition, in addition to a need to develop less expensive, high performance corrosion inhibitors, including chemistries that provide environmental benefits, health benefits (e.g., handling and manufacturing), manufacturing energy reduction, and reduction in waste generation.

BRIEF SUMMARY OF THE INVENTION

Corrosion inhibitor compositions are provided that can comprise a mixture of one or more transition metals, one or more organic phosphates, one or more inorganic phosphates, and hydroxyphosphono acetic acid and/or salts thereof.

Methods of mitigating corrosion of housings or conduits containing an aqueous medium are also disclosed. The methods can include the steps of providing a metal conduit for the aqueous medium, introducing an aqueous medium into the metal conduit, injecting a mixture of an effective amount of one or more transition metals, one or more organic phosphates, and one or more inorganic phosphates into the aqueous medium, and injecting an effective amount of hydroxyphosphono acetic acid and/or salts thereof into the aqueous medium.

In certain aspects, the methods can further include treating the metal conduit with an effective amount of a mixture of one or more transition metals, one or more organic phosphates, and one or more inorganic phosphates before the aqueous medium is introduced into the metal conduit and treating the metal conduit with an effective amount of hydroxyphosphono acetic acid and/or salts thereof before the aqueous medium is introduced into the metal conduit.

The foregoing has outlined rather broadly the features and technical advantages of the present disclosure in order that the detailed description of the invention that follows may be better understood. Additional features and advantages of the disclosure will be described hereinafter that form the subject of the claims. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
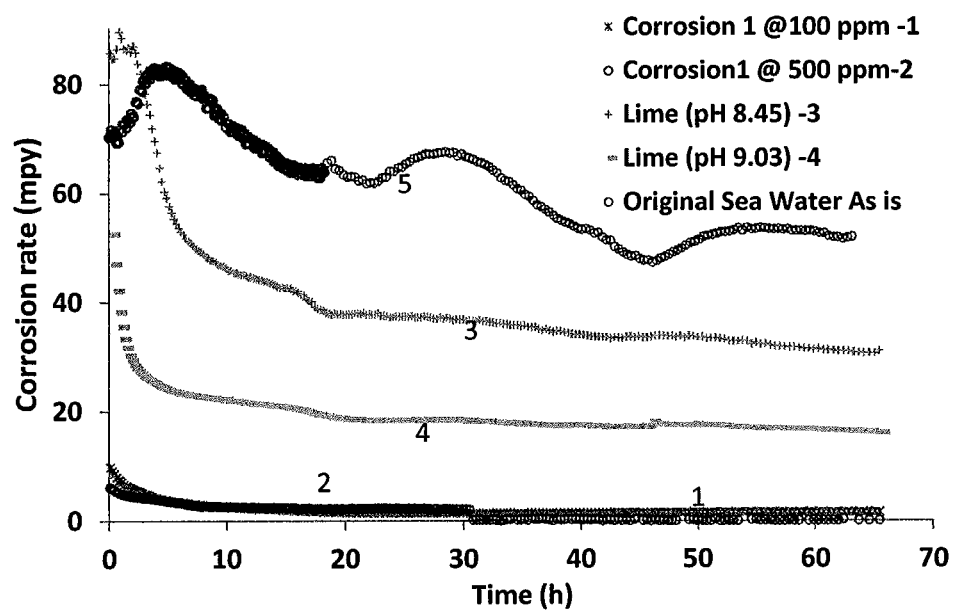
FIG. 1 shows a chart depicting the LPR results of an experiment run in the presence or absence of Corrosion Inhibitor 1 as a corrosion in sea water and the pH effect.
Figure 2:
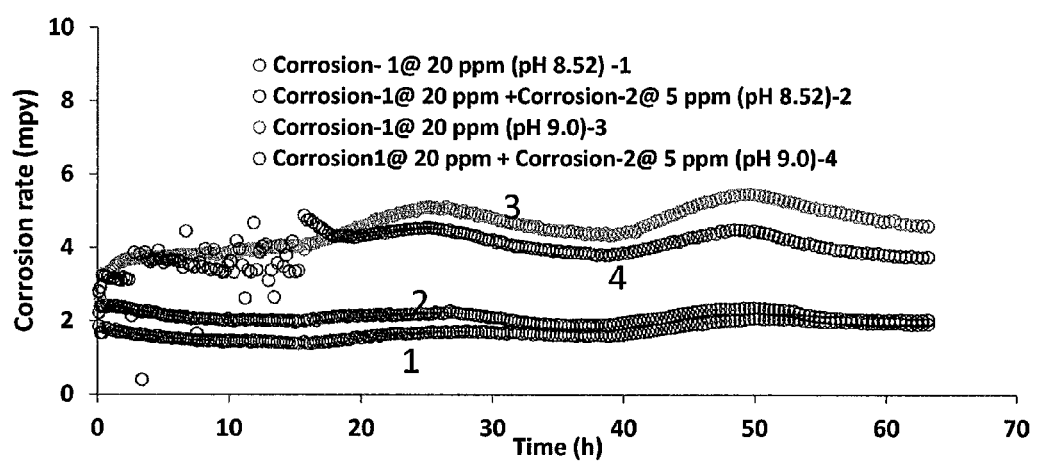
FIG. 2 shows a chart depicting the LPR results of an experiment run using Corrosion Inhibitor 1 in the presence or absence of Corrosion Inhibitor 2 under adjusted pH and the test coupons were precoated using Corrosion Inhibitor 1 without pH adjustment.

The present disclosure provides a treatment including compositions and methods useful for inhibiting corrosion of metal surfaces in contact with aqueous media. This treatment eliminates the use of an oxygen scavenger and it also eliminates the need to construct degasification facilities.

As used herein, "corrosion inhibitor" is intended to refer to at least one of, or any combination of, the disclosed corrosion inhibitors, corrosion inhibitor intermediates, and corrosion inhibitor product formulations.

In an aspect, a corrosion inhibitor of the present disclosure can include multiple components. For example, the corrosion inhibitor can include a mixture of any transition metal, an organic phosphate, and an inorganic phosphate. This mixture can be present in the corrosion inhibitor in amounts ranging from about 2 ppm to about 500 ppm. For example, the mixture can be present in amounts ranging from about 2-about 5 ppm, or about 5-about 20 ppm, or about 30-about 50 ppm, or about 70-about 100 ppm, or about 200-about 500 ppm, or any range or sub-range thereof. In one embodiment, the mixture includes zinc, o-$PO_4$, and PSO. This mixture is referred to herein as "Corrosion Inhibitor 1" While a corrosion inhibitor comprising a mixture of any transition metal, an organic phosphate, and an inorganic phosphate can include these three components in any ratio, 50 ppm of Corrosion Inhibitor 1 would include 3 ppm of active zinc, 12 ppm of active o-$PO_4$, and 4.7 ppm of active PSO.

Transition metals are commonly known in the art. An example of a transition metal is zinc. Organic phosphates are also commonly known in the art and examples of such are phospheno, phosphono, and phosphonate containing compounds. Similarly, inorganic phosphates are commonly known in the art and an example of such is orthophosphate or $PO_4$.

The presently disclosed corrosion inhibitor can further comprise a dispersant. The dispersant can be, for example, any polymer, copolymer, terpolymer, etc., comprising acrylic acid or acrylamide with sulfonated monomers. An example of such a dispersant is a copolymer of acrylic acid/2-acrylamido-2-methylpropane sulfonic acid (AMPS). Another example of such a dispersant is a copolymer of acrylic acid/acrylamide. An additional example of such a dispersant is a terpolymer of acrylic acid/acrylamide/sulfonated acrylamide. All monomer ratios in each of the presently disclosed copolymers or terpolymers are intended to be covered by the present disclosure. In one aspect, the dispersant is a terpolymer comprising acrylic acid/acrylamide/sulfonated acrylamide in a monomer ratio of about 40/about 20/about 40. This specific embodiment is referred to herein as "Corrosion Inhibitor 2." 50 ppm of Corrosion Inhibitor 2 would comprise 14.5 ppm of active terpolymer.

The dispersant can be present in the corrosion inhibitor in amounts ranging from about 1 to about 50 ppm. For example, the dispersant can be present in amounts ranging from about 1-about 10 ppm, or about 5-about 20 ppm, or about 30-about 50 ppm, or any range or sub-range thereof. In one embodiment, the dispersant is Corrosion Inhibitor 2 and is present in the corrosion inhibitor composition in an amount of about 5 ppm.

Additionally, the corrosion inhibitor of the present disclosure can comprise hydroxyphosphono acetic acid and/or salts thereof. The hydroxyphosphono acetic acid and/or salts thereof can be present in the corrosion inhibitor in amounts ranging from about 1 to about 50 ppm. For example, the hydroxyphosphono acetic acid and/or salts thereof can be present in amounts ranging from about 1-about 5 ppm, about 5-about 10 ppm, about 10-about 25 ppm, or about 25-about 50 ppm, or any range or sub-range thereof. As referred to herein the present application, "Corrosion Inhibitor 3" is hydroxyphosphono acetic acid. 50 ppm of Corrosion Inhibitor 3 would include 25 ppm of active hydroxyphosphono acetic acid. In an aspect, Corrosion Inhibitor 3 can be present in the corrosion inhibitor composition in an amount of about 2.5 ppm.

Thus, in one aspect, the presently disclosed corrosion inhibitor can comprise a mixture of any transition metal, an organic phosphate, an inorganic phosphate, a dispersant, and hydroxyphosphono acetic acid and/or salts thereof. It thus follows that in one aspect, the corrosion inhibitor composition can comprise Corrosion Inhibitor 1, Corrosion Inhibitor 2, and Corrosion Inhibitor 3.

In another aspect, the presently disclosed corrosion inhibitor can comprise a mixture of any transition metal, an organic phosphate, an inorganic phosphate, and hydroxyphosphono acetic acid and/or salts thereof. It thus follows that in one aspect, the corrosion inhibitor composition can comprise Corrosion Inhibitor 1 and Corrosion Inhibitor 3.

In yet a further aspect, the presently disclosed corrosion inhibitor can comprise a mixture of any transition metal, an organic phosphate, and an inorganic phosphate. It thus follows that in one aspect, the corrosion inhibitor composition comprises only Corrosion Inhibitor 1.

In certain aspects of the present disclosure, the treatment contemplated by the present disclosure can include an initial pretreatment of the metal surface of the system incorporating a pre-passivation step using about 100 ppm of a mixture of zinc, an organic phosphate, and an inorganic phosphate plus about 50 ppm of hydroxyphosphono acetic acid. Sea water can be introduced into the metal system and the pH of the sea water can optionally be adjusted to about 8.5 using lime, followed by a water treatment step using about 5 ppm of a mixture of zinc, an organic phosphate, and an inorganic phosphate, plus about 2.5 ppm hydroxyphosphono acetic acid.

For example, a method of mitigating corrosion according to the present disclosure can include providing a metallic housing or conduit that will contain an aqueous medium. The metal conduit can be pretreated with an effective amount of a mixture of one or more transition metals, one or more organic phosphates, and one or more inorganic phosphates. The metal conduit can also be pretreated with an effective amount of hydroxyphosphono acetic acid and/or salts thereof. After these pretreatment steps, an aqueous medium can be introduced into the metal or housing. After introduction of the aqueous medium, a mixture of an effective amount of one or more transition metals, one or more organic phosphates, and one or more inorganic phosphates can be injected into the aqueous medium. Finally, an effective amount of hydroxyphosphono acetic acid and/or salts thereof can be injected into the aqueous medium. Thereby, corrosion of the metal conduit or housing will be mitigated or prevented.

In certain aspects of this method, the pH of the aqueous medium can be adjusted to about 8.5 by adding lime or soda ash thereto.

In certain aspects, the effective amount of the mixture of one or more transition metals, one or more organic phosphates, and one or more inorganic phosphates in the initial pretreating step is about 100 ppm and the effective amount of hydroxyphosphono acetic acid and/or salts thereof in the initial pretreating step is about 50 ppm.

Moreover, in certain aspects, the effective amount of the mixture of one or more transition metals, one or more organic phosphates, and one or more inorganic phosphates in the injecting step is from about 5 ppm to about 20 ppm and the effective amount of hydroxyphosphono acetic acid and/or salts thereof in the injecting step is from about 2.5 ppm to about 10 ppm.

In certain aspects, the aqueous medium is sea water. Also, in certain aspects, the one or more transition metals comprises zinc.

According to the present disclosure, the selection of the appropriate combination of components, and amounts of components, can be based upon, for example, the type of aqueous media causing the corrosion and/or the type of corrosion. In this regard, if the aqueous media is alkaline or has a basic pH, one may select a corrosion inhibitor comprising a mixture of any transition metal, an organic phosphate, an inorganic phosphate, a dispersant, and hydroxyphosphono acetic acid and/or salts thereof.

Dissolved phosphates of the present corrosion inhibitor assist in the corrosion inhibition process. However, in an alkaline media, the phosphates can precipitate from the solution and are thus rendered useless for their desired corrosion inhibition purposes. For example, in an alkaline media, if the corrosion inhibitor comprises a mixture of a transition metal such as zinc, an organic phosphate, an inorganic phosphate, and hydroxyphosphono acetic acid and/or salts thereof, zinc phosphate can form and/or calcium phosphate can form. The zinc phosphates and calcium phosphates will precipitate and thus, these phosphates will lose their corrosion inhibition properties. Thus, in an alkaline media, one can include a dispersant in the corrosion inhibitor. That is, the corrosion inhibitor can comprise any transition metal, an organic phosphate, an inorganic phosphate, a dispersant, and optionally hydroxyphosphono acetic acid and/or salts thereof. The dispersant component will assist in blocking the formation of the undesired phosphate precipitates and will thus allow the phosphates to remain dissolved and perform their function as corrosion inhibitors.

It follows then, in an acidic media, there may be no need to include a dispersant component in the corrosion inhibitor, such as Corrosion Inhibitor 2. In general, the lower the pH of the aqueous media, the less corrosive the media becomes.

Thus, the present inventors have discovered a synergistic combination of a mixture of any transition metal, an organic phosphate, an inorganic phosphate, optionally a dispersant, and hydroxyphosphono acetic acid and/or salts thereof. Lime or soda ash is useful for lowering the pH of the aqueous media. In turn, this will lower the effective amount of the mixture of the transition metal, the organic phosphate, and the inorganic phosphate necessary to effectively inhibit or prevent corrosion. Thereby, the overall cost of the treatment will be dramatically reduced as soda ash or lime is significantly less expensive than the mixture of transition metal, organic phosphate, and inorganic phosphate.

One type of unique aqueous media is sea water. This media is dramatically different than other aqueous media, such as municipal water, because it has a large amount of total dissolved solids (TDS), for example. In activities such as mining, one difficulty that can be encountered is a shortage of water supply. In Chile, in order to overcome this difficulty, some mining companies have proposed to transport water from Pacific Ocean up to the mountains using mild steel pipelines. In such a situation, studies need to be carried out to identify a proper corrosion inhibitor for the sea water media and due to the complexity and uniqueness of sea water, this is an intensive task. As can be seen from the examples in the present specification, all aspects of the presently claimed corrosion inhibitor were successful in mitigating, inhibiting and/or preventing corrosion of metals exposed to sea water.

Furthermore, different types of corrosion can occur and this can also help determine which components should be included in the corrosion inhibitor. For example, "pitting corrosion," or "pitting," is a localized form of corrosion that causes or develops craters or potentially small holes in the metal. Essentially, the corrosion penetrates deeper and deeper into the metal in a small, localized area, causing loss of metal. The inner surface, or portion of the surface contacting the corrosive media that comprises the pitting, usually becomes anodic, while a potentially large area of the remainder of the inner metal surface becomes cathodic. Where the surface to be treated includes pitting, one may choose to include hydroxyphosphono acetic acid and/or salts thereof, in the corrosion inhibitor composition. The hydroxyphosphono acetic acid and/or salts thereof can deposit over, or cover, salts formed in the crater or pit and block further pitting.

As can be seen in the examples disclosed herein, the present inventors have discovered a synergistic combination of ingredients that inhibit or prevent pitting, as well as other types of corrosion. In certain aspects, the synergy is between a mixture of a transition metal such as zinc, an organic phosphate, an inorganic phosphate, and hydroxyphosphono acetic acid and/or salts thereof.

Thus, in one aspect, where pitting corrosion is involved, a corrosion inhibitor according to the present disclosure can comprise a mixture of a transition metal, an organic phosphate, an inorganic phosphate, and hydroxyphosphono acetic acid and/or salts thereof. In another aspect, the corrosion inhibitor can comprise a mixture of a transition metal, an organic phosphate, an inorganic phosphate, a dispersant, and hydroxyphosphono acetic acid and/or salts thereof.

The presently disclosed corrosion inhibitor can be injected into the aqueous system by any means known in the art. For example, the inhibitor can be injected via a chemical metering pump into aqueous system. Other acceptable methods of injection include pretreating/precoating the metal surfaces before exposure to the corrosive aqueous media, continuous injection, or batch treating. Continuous injection may be performed where appropriate chemical injection equipment is available in the field along with chemical storage tanks. Otherwise, the chemical may be treated using a specialized treatment vehicle which applies a large chemical dosage at long time intervals, usually every one to two weeks, and in certain cases, monthly. Batch application may be performed through the use of a treating truck comprising a storage tank containing the corrosion inhibitor(s) (and optionally other chemicals) and a large water tank. The treating truck travels to field locations and treats individual sites.

EXAMPLES

Procedures were set up to test the effectiveness of the presently disclosed corrosion inhibitors in mitigating corrosion in steel under aerated sea water environments. Precoating/pretreating of the metal surface using 100 ppm of a mixture of Corrosion Inhibitor 1 (which includes 6 ppm active zinc, 24 ppm active o-$PO_4$, and 9.4 ppm active PSO), and 50 ppm of Corrosion Inhibitor 3 (which includes 25 ppm of active terpolymer) was tested in connection with sea water having a pH of 8.5. Once the metal surface was passivated, protection against corrosion was supplied by treating aerated sea water using Corrosion Inhibitor 1 and Corrosion Inhibitor 3. The dosage of corrosion inhibitors varied according to water composition and the specific characteristics of each system.

As can be seen below and in the drawing figures, successful results were achieved in synthetic sea water with a pH of 8.5 at room temperature using 5 ppm of Corrosion Inhibitor 1 and 2.5 ppm of Corrosion Inhibitor 3. The use of sea water samples from the Atlantic Ocean (Rio de Janeiro) required higher dosages, e.g. Corrosion Inhibitor 1 was dosed between 10-20 ppm and the Corrosion Inhibitor 3 was dosed between 5-10 ppm at an 8.5 pH.

Tests were also carried out using synthetic sea water, which was produced by adding ions in demineralized water to reach the composition found in an analysis of a sample taken from a collecting point of the Pacific Ocean off of Chile. Validation trials were performed using real samples of sea water from the Pacific Ocean collected at this collecting point off of Chile or samples of sea water collected from the Atlantic Ocean off of Rio de Janeiro at Barra da Tijuca beach.

Tubular-shaped test coupons made of C1018 mild carbon steel were used for the electrochemical and weight loss measurements. Test coupon dimensions were:
  outside diameter: 12.0 mm;
  inside diameter: 6.0 mm;
  length: 8.0 mm.

In certain aspects, the test coupons received a surface pretreatment before use. Where the test coupons were pretreated, the test coupons were dipped for two minutes in acetone, two minutes in xylene, and then an additional two minutes in acetone in order to remove any residual, oily substances. The test coupons were then immersed into concentrated hydrochloric acid (36%) for five minutes. Lastly, the test coupons were copiously rinsed with distilled water and inserted into the rotating cylinder electrode support.

The corrosion inhibitors and auxiliaries selected for this study were:
  A. A mixture of zinc, an organic phosphate (PSO), and an inorganic phosphate (o-$PO_4$) ("Corrosion Inhibitor 1")
  B. Hydroxyphosphono acetic acid ("Corrosion Inhibitor 3")
  C. Dispersant comprising a terpolymer of acrylic acid/acrylamide/sulfonated acrylamide ("Corrosion Inhibitor 2")

In Drawing FIGS. 1-8, "Corrosion 1=Corrosion Inhibitor 1," "Corrosion 2=Corrosion Inhibitor 2," and "Corrosion 3=Corrosion Inhibitor 3."

In certain experiments, the pH of the sea water was adjusted using lime ($Ca(OH)_2$). Electrochemical polarization measurements were performed using an Autolab PGSTAT 302N driven by NOVA 1.8 Software. All trials were carried out at room temperature.

For corrosion inhibition trials, four conventional glass cells (1000 $cm^3$ in volume, assembled in parallel) were used for the polarization studies. All potential measurements were performed with sea water; a metallic stainless steel object was used as a pseudo-reference electrode and a stainless steel rod was used as a counter electrode.

All experiments for corrosion rate measurement, as well as for corrosion inhibitor selection, were carried out using linear polarization resistance technique (LPR). LPR is one of the most commonly used methods to measure corrosion rate. It is a DC electrochemical technique and is typically based on the imposition of a small voltage to the electrodes, (−10 mV to +10 mV) around the Open Circuit Potential (OCP). If the potential is raised above the free corrosion potential (Ecorr), the metal dissolution rate will increase. Conversely, if the potential is lowered, the rate will decrease. The LPR technique assumes that the exponential anodic (i.e. potential above Ecorr), and the cathodic (i.e. potential below Ecorr) polarization curves approximate to a straight line close to the free corrosion potential (OCP).

The corrosion rate can then be derived from the theoretical Stern and Geary[2] analysis of polarization curves and Faraday's Law.

Another way to follow corrosion rate is through mass loss balance. This technique is suitable for both generalized and localized corrosion and can be described as follows. The tubular test coupons received a surface treatment after each electrochemical experiment in order to remove any corrosion product eventually deposited on the surface before being weighed. The test coupons were copiously rinsed with water, smoothly brushed, and then immersed into concentrated hydrochloric acid for 5 seconds. Finally, the test coupons were copiously rinsed with distilled water, dried, and weighed.

Once the corrosion rate (CR) is known for a specific sample of water, corrosion inhibitor performance can be evaluated. Measurement of weight loss along with instantaneous electrochemical corrosion using LPR was carried out keeping the rotating electrode at 2000 rpm. The assays were carried in the presence or absence of a corrosion inhibitor. The percent protection relative to blank samples can be determined for each chemical according to the following equation:

Efficiency of inhibition (%)=$((CR-CR_{CI}) \times 100)/CR$, wherein CR is the corrosion rate without any treatment and $CR_{CI}$ is the corrosion rate determined in the presence of a corrosion inhibitor.

Coating is a known mechanism of protection by which some anticorrosive additives work. This technique was tested in order to verify if improved performance of the presently disclosed corrosion inhibitors could be achieved. In these experiments, an RCE electrode was submerged into a bath of sea water at room temperature containing particular embodiments of the presently disclosed corrosion inhibitors. The electrode remained in this condition under 2000 rpm stirring for 24 hours. During this time, corrosion rate was not monitored and after the coating period, the electrode was immediately submerged into the sea water medium with a specified amount of a corrosion inhibitor and submitted to further electrochemical and mass loss balance trials.

Diagnosis between localized (pitting) and general corrosion can be accomplished through surface examination before and after each trial. This exam was recorded using a digital camera and microscopy with 40× or 100× magnification lens. This qualitative method is extremely useful to evaluate the performance of corrosion inhibitors, especially when localized corrosion or pitting is taking place.

Corrosion rate of mild steel submerged in untreated sea water was compared with values obtained using different dosages of certain presently disclosed corrosion inhibitors under different conditions, such as after prepassivation of the metal surface using the same corrosion inhibitor. Corrosion rates were continuously measured using the LPR electrochemical technique until variation of the values was no longer detected for a sufficient period of time, i.e. until stabilization of corrosion the rate. Weight loss balance data were also used to confirm the LPR results.

Trials were carried out in order to evaluate if a localized corrosion process was due to the nature of water chemistry, and if it could be avoided during a precoating/pretreating step. Four trials were setup in parallel using sea water under different conditions as follows. The first using 100 ppm of Corrosion Inhibitor 1, the second using 500 ppm of Corrosion Inhibitor 1, the third in absence of a corrosion inhibitor but with pH adjusted to 8.45, and the fourth in the absence of corrosion inhibitor with pH adjusted to 9.03. All trials were monitored using LPR for 66 hours. Coupons were weighed at the beginning and at the end of the trial after cleaning. Results are shown in Table 1 and FIG. 1. Visual analysis of the surface also helped to diagnose between localized and generalized corrosion phenomena.

TABLE 1

Trial conditions and weight loss balance results in the presence or absence of Corrosion Inhibitor 1 as corrosion inhibitor in sea water and pH effect. Trial time 66 hours.

| Trial | Corrosion Inhibitor 1 (ppm) | Initial pH | Final pH | Corrosion rate (mpy)* |
|---|---|---|---|---|
| 1 | — | 7.90 | 8.19 | 83.4 |
| 2 | 100 | 6.60 | 7.91 | 2.4 |
| 3 | 500 | 6.00** | 7.55 | 2.7 |
| 4 | — | 8.45** | 8.35 | 42.7 |
| 5 | — | 9.03** | 8.84 | 15.5 |

*Calculated based on mass loss balance
**pH adjusted with Ca(OH)$_2$.

Visual examination of the surfaces of the electrode can indicate the presence of localized or pitting corrosion that otherwise would not be detected by LPR or mass loss balance techniques. The electrode surface, which was submerged into untreated sea water, presented clear signals of localized corrosion. This means that besides being very corrosive, this medium can also rapidly damage the equipment. As can be noted from the data, simply adjusting the pH is not enough to avoid localized corrosion. This treatment can only moderately reduce the generalized corrosion rate as observed by LPR measurement but the presence of localized corrosion certainly would compromise the lifetime of the equipment. The use of Corrosion Inhibitor 1 was very effective to prevent generalized corrosion. The corrosion rate measured by LPR can be lower than 2 mpy using 100 ppm dosage and lower than 0.1 mpy using 500 ppm dosage. This corrosion inhibitor also presented some efficiency against localized corrosion, which is more clearly observed at 500 ppm dosage. In spite of this, such a high dosage could be impractical in this system due to the high consumption that it would represent (around 40,000 ton/year).

Since Corrosion Inhibitor 1 had the best performance against generalized corrosion but did not present completely satisfactory results against localized corrosion, the treatment was modified in order to assure full protection to steel surfaces in a sea water environment. In order to accomplish that objective, some trials using Corrosion Inhibitor 1 were carried out under controlled pH conditions. Supplementary corrosion inhibitor components (Corrosion Inhibitor 2 and Corrosion Inhibitor 3) were also incorporated into the Corrosion Inhibitor 1 corrosion inhibitor treatment with the specific purpose of mitigating localized corrosion. These experiments are described in the following trials.

In the first of these modified trials, coupons were precoated using 100 ppm of Corrosion Inhibitor 1 without pH adjustment for 24 h. This sequence of tests was carried out using Corrosion Inhibitor 1 (20 ppm) in the presence or absence of Corrosion Inhibitor 2 (5 ppm) under adjusted pH of 8.5 or 9.0 using Ca(OH)$_2$. Coupons were weighed at the beginning and at the end of the trial after cleaning. Results are shown in Table 2 and FIG. 2.

TABLE 2

Trial conditions and weight loss balance results using Corrosion Inhibitor 1 (20 ppm) in the presence or absence of Corrosion Inhibitor 2 (5 ppm) under adjusted pH. Coupons were precoated using Corrosion Inhibitor 1 (100 ppm) without pH adjustment.

| Trial | Corrosion Inhibitor 1 (ppm) | Corrosion Inhibitor 2 (ppm) | Adjusted pH | Final pH* | Corrosion rate (mpy) |
|---|---|---|---|---|---|
| 6 | 20 | 0 | 8.52 | 8.29 | 7.1 |
| 7 | 20 | 5 | 8.52 | 8.25 | 9.0 |
| 8 | 20 | 0 | 9.07 | 8.78 | 7.8 |
| 9 | 20 | 5 | 9.00 | 8.59 | 9.1 |

*After 64 hours trial.

All results were obtained using either the LPR technique or weight loss balance indicated a good corrosion inhibition efficiency of Corrosion Inhibitor 1 at 20 ppm. Results obtained at pH 8.5 and 9.0 in the presence of Corrosion Inhibitor 1 (Trials 6 to 9) are significantly improved when they are compared to results obtained in absence of Corrosion Inhibitor 1 even at controlled pH (Trials 4 and 5).

The Corrosion Inhibitor 2 showed an inhibition effect over localized corrosion. Images obtained either at pH 8.5 and 9.0 revealed a lower number of points of attack when this additive is used (Trials 7 and 9). The increased rate of corrosion observed in FIG. 2 for numbers 3 and 4 are due to scaling that occurred at the higher pH of 9.

Figure 3:
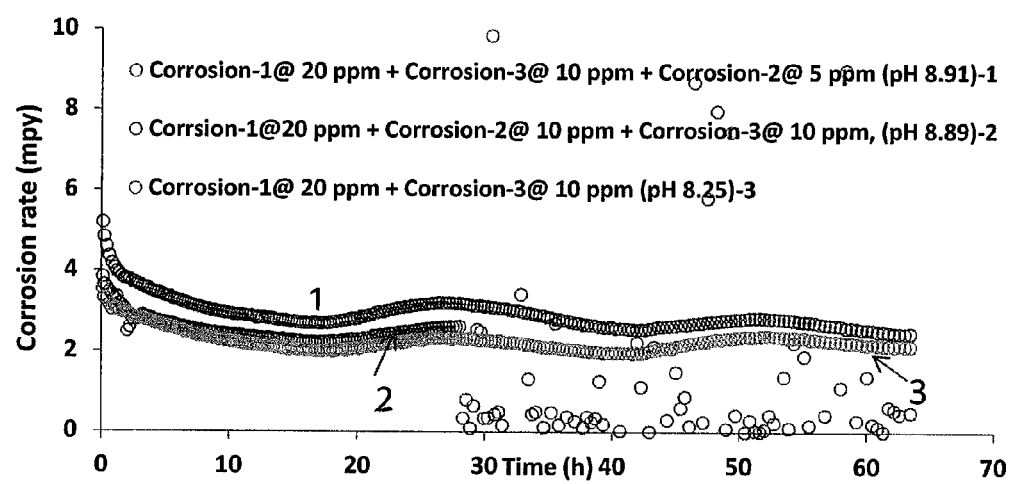
FIG. 3 shows a chart depicting the LPR results of an experiment using Corrosion Inhibitor 1 in the presence or absence of Corrosion Inhibitor 2 and/or Corrosion Inhibitor 3 under adjusted pH where the test coupons were precoated using Corrosion Inhibitor 1 without pH adjustment.

Corrosion Inhibitor 3 was also tested as a corrosion inhibitor auxiliary specifically applied to reduce localized corrosion. In these trials, coupons were precoated using 100 ppm of Corrosion Inhibitor 1 without pH adjustment for 24 h. Inhibitor dosages and experimental conditions as well weight loss balance results are shown in Table 3. Results of LPR electrochemical measurements are shown in FIG. 3.

TABLE 3

Experimental conditions and weight loss balance results using
Corrosion Inhibitor 1 (20 ppm) in the presence or absence of
Corrosion Inhibitor 2 and/or Corrosion Inhibitor 3
under adjusted pH. Coupons precoated using Corrosion Inhibitor
1 (100 ppm) without pH adjustment.

| Trial | Corrosion Inhibitor 1 (ppm) | Corrosion Inhibitor 3 (ppm) | Corrosion Inhibitor 2 (ppm) | Adjusted pH | Final pH* | Corrosion rate (mpy) |
|---|---|---|---|---|---|---|
| 10 | 20 | 10 | 5 | 8.91 | 8.65 | 5.5 |
| 11 | 20 | 5 | 15 | 8.89 | 8.56 | 4.9 |
| 12 | 20 | 10 | — | 8.25 | 8.03 | 4.2 |

*After 60 hours trial.

FIG. 3 shows LPR results using Corrosion Inhibitor 1 (20 ppm) in the presence or absence of Corrosion Inhibitor 2 and/or Corrosion Inhibitor 3 under adjusted pH. Coupons were precoated using Corrosion Inhibitor 1 (100 ppm) without pH adjustment. An electrical contact problem occurred in the middle of the trial using Corrosion Inhibitor 1 (20 ppm)+Corrosion Inhibitor 2 (15 ppm)+Corrosion Inhibitor 3 (10 ppm) and therefore these LPR data are valid just up to 29 hours. The use of Corrosion Inhibitor 3 promoted a clear improvement in global corrosion inhibition. Both LPR and weight loss balance results confirm this observation. Comparable tests are 9 with 10, and 7 with 12, which respectively were carried out under the same experimental conditions, but with the presence or absence of Corrosion Inhibitor 3. Corrosion rates measured by weight loss balance are significantly lower using Corrosion Inhibitor 3.

The use of Corrosion Inhibitor 3 clearly reduced localized corrosion in mild steel under sea water environment upon visual inspection of the test coupons as well. The surface of the coupon after chemical cleaning did not present any clear signs of pitting. There were only slight changes on the coupon surface observed after mechanical cleaning.

Figure 4:
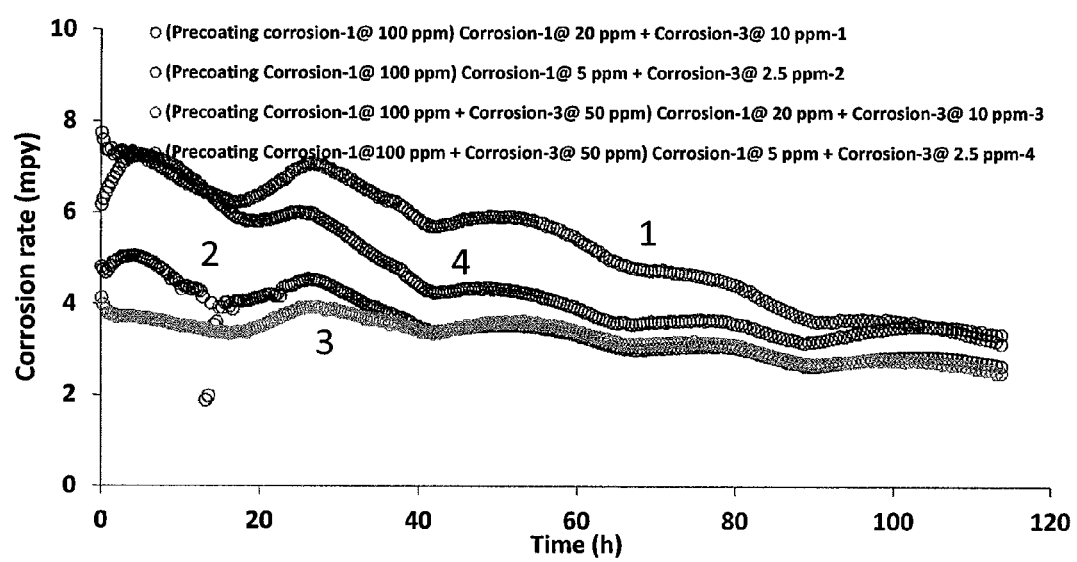
FIG. 4 shows a chart depicting the LPR results of an experiment using Corrosion Inhibitor 1 in the presence of Corrosion Inhibitor 3 under adjusted pH of 8.5 where the test coupons were precoated using Corrosion Inhibitor 1 and optionally Corrosion Inhibitor 3 with a pH adjustment to 8.5.
Figure 5:
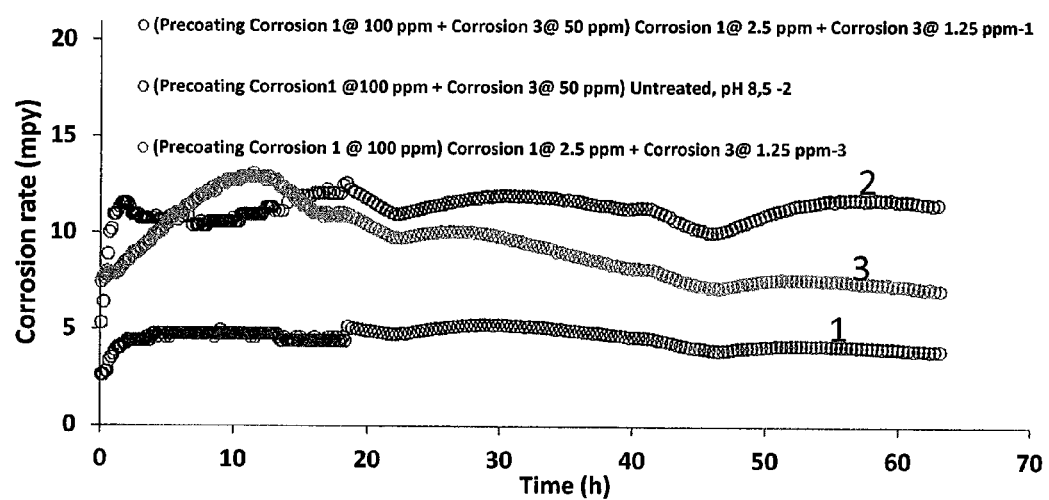
FIG. 5 shows a chart depicting the LPR results of an experiment run in a sea water environment under adjusted pH where the test coupons were precoated using Corrosion Inhibitor 1 and optionally Corrosion Inhibitor 3 with a pH adjustment to 8.5.

In order to confirm the efficiency of Corrosion Inhibitor 3, a set of long term experiments was carried out. Four coupons were precoated using Corrosion Inhibitor 1 (100 ppm) at controlled pH and optionally Corrosion Inhibitor 3 was added at the beginning of the precoating step. Considering the result obtained in Trial 2, the pH was adjusted during prepassivation in order to minimize any corrosion process that could take place during this step. After the prepassivation, coupons were submerged into pretreated sea water according to the conditions shown in Table 4. LPR data is shown in FIG. 4 and weight loss balance results are shown in Table 4.

TABLE 4

Experimental conditions and weight loss balance results using Corrosion
Inhibitor 1 in the presence of Corrosion Inhibitor 3 under adjusted pH.
Coupons were precoated using Corrosion Inhibitor 1 (100 ppm) and
optionally Corrosion Inhibitor 3 (50 ppm) with pH adjustment to 8.5.

| Trial | Precoating | Corrosion Inhibitor 1 (ppm) | Corrosion Inhibitor 3 (ppm) | Adjusted pH | Final pH* | Corrosion rate (mpy) |
|---|---|---|---|---|---|---|
| 13 | CR 1 at 100 ppm | 20 | 10 | 8.53 | 8.12 | 6.3 |
| 14 | CR 1 at 100 ppm | 5 | 2.5 | 8.49 | 8.07 | 3.8 |
| 15 | CR 1 at 100 ppm + CR 3 at 50 ppm | 20 | 10 | 8.49 | 8.08 | 4.3 |
| 16 | CR 1 at 100 ppm + CR 3 at 50 ppm | 5 | 2.5 | 8.50 | 8.09 | 5.3 |

*After 114 hours trial.

In the foregoing Table, CR 1=Corrosion Inhibitor 1 and CR 3=Corrosion Inhibitor 3. Trials 13 to 16 reveal that the use of Corrosion Inhibitor 1 along with Corrosion Inhibitor 3 is an efficient treatment to prevent generalized corrosion in mild steel under sea water environment. This treatment does not require oxygen removal and therefore its application is simpler than deaeration followed by oxygen scavenger addition. LPR measurement showed that the protecting film was stable during the whole trial period. In fact, a slight decrease in corrosion rate was observed, which reinforces this observation. Corrosion rate at the end of the trial was lower than 5 mpy for all experiments including under reduced corrosion inhibitor dosage (Trials 14 and 16). Small fluctuations in corrosion rate are in perfect agreement with temperature oscillations due to day/night cycle. Weight loss balance measurement also agreed with LPR data. Surface analysis of the coupons was carried out in order to verify the efficiency of this corrosion inhibitor combination against localized corrosion. It was visually observed that there was no sign of localized corrosion in either of the test coupons including in the trials using lower dosage (Trials 14 and 16).

Once a suitable treatment to prevent corrosion in a sea water environment under air was developed to protect mild steel, it was possible to consider the initial optimization of the system. The precoating film resistance against untreated sea water was studied as well as the effect of Corrosion Inhibitor 3 during the precoating step. Results and experimental conditions are shown in Table 5 and FIG. 5.

TABLE 5

Experimental conditions and weight loss balance results in sea
water environment under adjusted pH. Coupons were precoated
using Corrosion Inhibitor 1 (100 ppm) and optionally Corrosion
Inhibitor 3 (50 ppm) with pH adjustment to 8.5.

| Trial | Precoating | Corrosion Inhibitor 1 (ppm) | Corrosion Inhibitor 3 (ppm) | Adjusted pH | Final pH* | Corrosion rate (mpy) |
|---|---|---|---|---|---|---|
| 17 | CR 1 at 100 ppm + CR 3 at 50 ppm | 2.5 | 1.25 | 8.50 | 8.14 | 8.4 |
| 18 | CR 1 at 100 ppm + CR 3 at 50 ppm | — | — | 8.50 | 8.10 | 17.1 |
| 19 | CR 1 at 100 ppm | 2.5 | 1.25 | 8.50 | 8.12 | 13.5 |

*After 63 hours trial.

In the foregoing Table, CR 1=Corrosion Inhibitor 1 and CR 3=Corrosion Inhibitor 3. Trial 18 was carried out using untreated sea water under air atmosphere and it showed that the corrosion rate sharply increases at the beginning of the trial and keeps at 12 mpy. This is an indication that the precoated film is not resistant enough to stay intact in the absence of corrosion inhibitors in this medium. Comparisons between Trial 17 and 19 revealed that prepassivation is more efficient once Corrosion Inhibitor 3 is used in this step. Corrosion rate measured either by weight loss balance or LPR is lower using a mixture of Corrosion Inhibitor 1 and Corrosion Inhibitor 3 as precoating additives than using Corrosion Inhibitor 1 alone. Visual inspection of the surfaces of the test coupons in the last three trials did not reveal any localized attack indicating that the main component is generalized corrosion.

Figure 6:
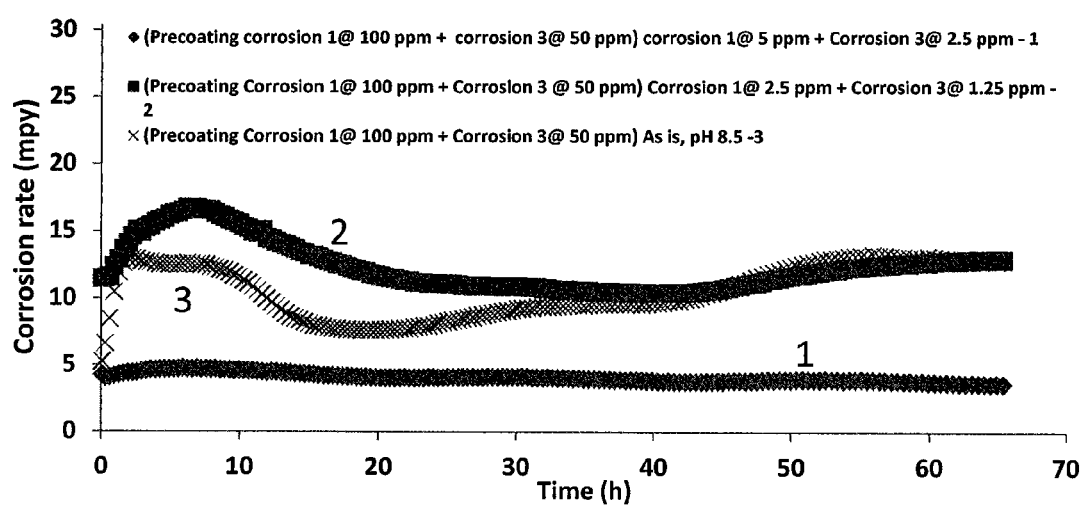
FIG. 6 shows a chart depicting the LPR results of an experiment run in a sea water environment under adjusted pH where the test coupons were precoated using Corrosion Inhibitor 1 and Corrosion Inhibitor 3 with a pH adjustment to 8.5.
Figure 7:
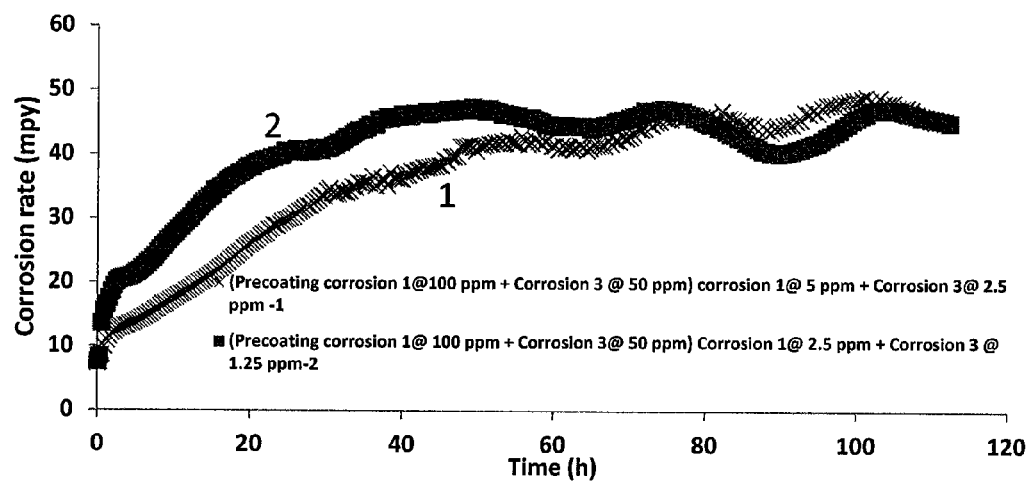
FIG. 7 shows a chart depicting the LPR results of an experiment run with sea water from the Pacific Ocean under adjusted pH where the test coupons were precoated using Corrosion Inhibitor 1 and Corrosion Inhibitor 3 with a pH to 8.5.

In order to confirm the last results regarding the optimized dosage of corrosion inhibitors as well as the resistance of prepassivated film, trials 16, 17 and 18 were repeated under exactly the same conditions. Experimental conditions and weight loss balance are shown in Table 6. LPR results are shown in FIG. 6.

TABLE 6

Experimental conditions and weight loss balance results in sea water environment under adjusted pH. Coupons were precoated using Corrosion Inhibitor 1 (100 ppm) and Corrosion Inhibitor 3 (50 ppm) with pH adjustment to 8.5.

| Trial | Precoating | CR 1 (ppm) | CR 3 (ppm) | Adjusted pH | Final pH* | Corrosion rate (mpy) |
|---|---|---|---|---|---|---|
| 20 | CR 1 at 100 ppm + CR 3 at 50 ppm | 5 | 2.5 | 8.48 | 8.14 | 8.3 |
| 21 | CR 1 at 100 ppm + CR 3 at 50 ppm | 2.5 | 1.25 | 8.47 | 8.12 | 15.2 |
| 22 | CR 1 at 100 ppm + CR 3 at 50 ppm | — | — | 8.48 | 8.13 | 6.2 |

*After 65 hours trial.

In the foregoing Table, CR 1=Corrosion Inhibitor 1 and CR 3=Corrosion Inhibitor 3. LPR results of trial 22 once again revealed that the precoated film produced using 100 ppm of Corrosion Inhibitor 1 and 50 ppm of Corrosion Inhibitor 3 cannot maintain corrosion rates at values lower than 5 mpy in the absence of a corrosion inhibitor in an aerated sea water medium. Visual inspection of this coupon also revealed signs of attack on the surface of the metal. Weight loss balance did not agree with LPR, surface analysis, and Trial 18 data, but it is believed that an experimental error happened specifically related to this result. This specific result should therefore not be relied upon as indicative of the expected result. Trial 21 using 2.5 ppm of Corrosion Inhibitor 1 and 1.25 ppm of Corrosion Inhibitor 3 under aerated sea water medium presented a better corrosion inhibition compared to Trial 22. Nevertheless, LPR data also revealed a strong increase in the corrosion rate at the beginning of the trial followed by variable, but always high, corrosion rates. This observation indicated that this dosage of corrosion inhibitors may not always guarantee good performance in this medium.

A procedure that presented the outstanding performance in mitigating corrosion in mild steel under an aerated sea water environment is the precoating of the metal surface using Corrosion Inhibitor 1 (100 ppm) plus Corrosion Inhibitor 3 (50 ppm) in sea water at 8.5 pH. Once the metal surface is passivated, the protection against corrosion is provided by treating the aerated sea water using Corrosion Inhibitor 1 (5 ppm) plus Corrosion Inhibitor 3 (2.5 ppm) at 8.5 pH.

The experiments above were carried out using synthetic sea water. In order to confirm that these results are valid for real samples, a series of long term trials were performed using water samples collected from the Pacific and Atlantic Oceans. Real samples from the Pacific Ocean were tested according to the experimental procedure herein described; precoating the metal surface using Corrosion Inhibitor 1 (100 ppm) plus Corrosion Inhibitor 3 (50 ppm) in sea water at pH 8.5 followed by addition of Corrosion Inhibitor 1 plus Corrosion Inhibitor 3 at 8.5 pH. Results are shown in Table 7 and FIG. 7.

TABLE 7

Experimental conditions and weight loss balance results in sea water from the Pacific Ocean under adjusted pH. Coupons were precoated using Corrosion Inhibitor 1 (100 ppm) and Corrosion Inhibitor 3 (50 ppm) with pH adjustment to 8.5.

| Trial | Precoating | CR 1 (ppm) | CR 3 (ppm) | Adjusted pH | Final pH* | Corrosion rate (mpy) |
|---|---|---|---|---|---|---|
| 23 | CR 1 at 100 ppm + CR 3 at 50 ppm | 5 | 2.5 | 8.50 | 8.33 | 58.6 |
| 24 | CR 1 at 100 ppm + CR 3 at 50 ppm | 2.5 | 1.25 | 8.53 | 8.35 | 61.9 |

*After 114 hours trial.

In the foregoing Table, CR 1=Corrosion Inhibitor 1 and CR 3=Corrosion Inhibitor 3. The corrosion inhibition treatment that was successfully applied using synthetic sea water did not present the same performance in the presence of sea water from the Pacific Ocean. Corrosion measured by weight loss balance as well LPR results pointed to a rate higher than 45 mpy. Surface visual analysis also shows the presence of localized corrosion, especially crevice corrosion. These data indicate that the right dosage for a particular sea water composition must be specifically optimized and is not predictable.

Figure 8:
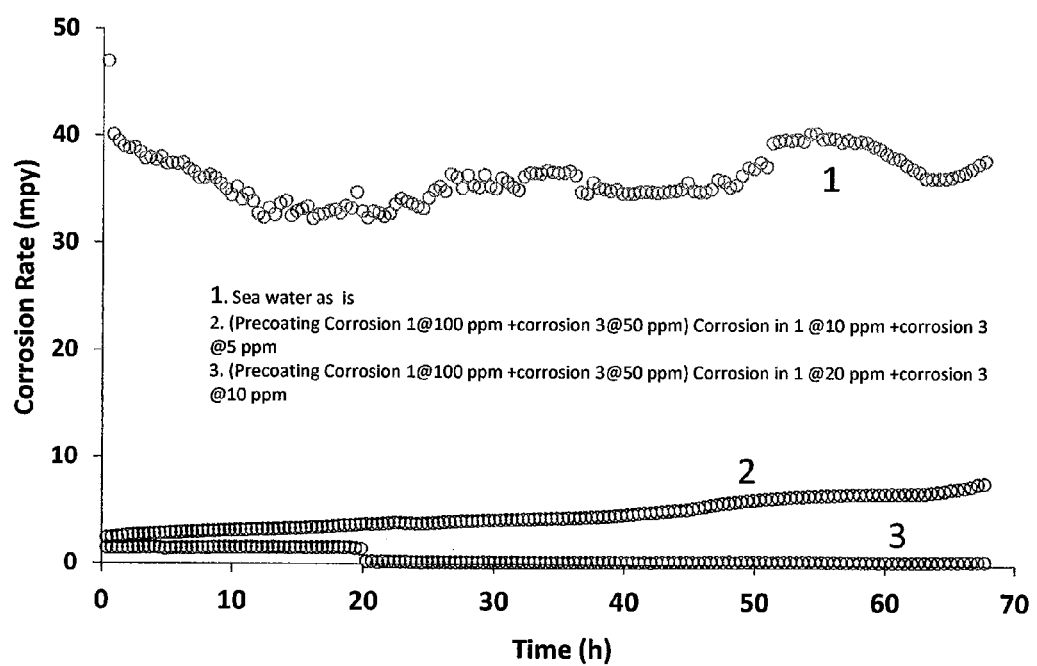
FIG. 8 shows a chart depicting the LPR results of an experiment run with sea water from the Atlantic Ocean under adjusted pH where the test coupons were precoated using Corrosion Inhibitor 1 and Corrosion Inhibitor 3 with a pH adjustment to 8.5.

Trials using sea water from the Atlantic Ocean were carried out using the same prepassivation procedure but with different corrosion inhibitor dosages in the sea water. Results are shown in Table 8 and FIG. 8. In FIG. 8, Trial 26 is not depicted due to an error that occurred in carrying out the experiment.

TABLE 8

Experimental conditions and weight loss balance results in sea water from the Atlantic Ocean under adjusted pH. Coupons were precoated using Corrosion Inhibitor 1 (100 ppm) and Corrosion Inhibitor 3 (50 ppm) with pH adjustment to 8.5.

| Trial | Precoating | CR 1 (ppm) | CR 3 (ppm) | Adjusted pH | Final pH* | Corrosion rate (mpy) |
|---|---|---|---|---|---|---|
| 25 | — | — | — | 8.21 | 8.23 | 99.1 |
| 26 | CR 1 at 100 ppm + CR 3 at 50 ppm | 5 | 2.5 | 8.50 | 8.31 | 64.3 |
| 27 | CR 1 at 100 ppm + CR 3 at 50 ppm | 10 | 5 | 8.49 | 8.33 | 10.2 |
| 28 | CR 1 at 100 ppm + CR 3 at 50 ppm | 20 | 10 | 8.50 | 8.31 | 3.6 |

*After 68 hours trial.

In the foregoing Table, CR 1=Corrosion Inhibitor 1 and CR 3=Corrosion Inhibitor 3. Results using sea water from the Atlantic Ocean confirmed that it is possible to mitigate corrosion in a sea water environment under air by using corrosion inhibitors. Data of weight loss balance and LPR demonstrate that there could be an optimal dosage of inhibitor that is able to mitigate and stabilize the corrosion rate. For synthetic seawater, Corrosion Inhibitor 1 (5 ppm) plus Corrosion Inhibitor 3 (2.5 ppm) dosages are enough to prevent corrosion after pre-passivation, while this dosage had to be increased in order to achieve the same results in sea water samples from the Atlantic Ocean. The use of Corrosion Inhibitor 3 along with Corrosion Inhibitor 1 is an effective anticorrosive treatment for sea water and the right dosage of these products should be optimized according to the environment that the mild steel will be in contact with.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of mitigating corrosion of a conduit containing an aqueous medium comprising:
    (a) providing a metal conduit;
    (b) introducing an aqueous medium into said metal conduit;
    (c) injecting a mixture comprising an effective amount of one or more transition metals, one or more organic phosphates, and one or more inorganic phosphates into said aqueous medium;
    (d) injecting an effective amount of hydroxyphosphono acetic acid and/or salts thereof into said aqueous medium,
    (e) treating said metal conduit with an effective amount of a mixture comprising one or more transition metals, one or more organic phosphates, and one or more inorganic phosphates before step (b); and
    (f) treating said metal conduit with an effective amount of hydroxyphosphono acetic acid and/or salts thereof before step (b).

2. The method of claim 1, wherein said effective amount in step (e) is about 100 ppm and said effective amount in step (f) is about 50 ppm.

3. The method of claim 1, further comprising the step of adjusting a pH of the aqueous medium to about 8.5 by adding lime or soda ash.

4. The method of claim 1, wherein said effective amount in step (c) is from about 5 ppm to about 20 ppm and said effective amount in step (d) is from about 2.5 ppm to 10 ppm.

5. The method of claim 1, wherein said aqueous medium is sea water.

6. The method of claim 1, wherein said one or more transition metals comprises zinc.

7. A method of mitigating corrosion of a conduit containing an aqueous medium comprising:
    (a) providing a metal conduit;
    (b) introducing an aqueous medium into said metal conduit;
    (c) injecting a mixture comprising an effective amount of one or more transition metals, one or more organic phosphates, and one or more inorganic phosphates into said aqueous medium; and
    (d) injecting an effective amount of hydroxyphosphono acetic acid and/or salts thereof into said aqueous medium, wherein said aqueous medium is sea water.

8. A method of mitigating corrosion of a conduit containing an aqueous medium comprising:
    (a) providing a metal conduit;
    (b) introducing an aqueous medium into said metal conduit;
    (c) injecting a mixture comprising an effective amount of one or more transition metals, one or more organic phosphates, and one or more inorganic phosphates into said aqueous medium, wherein said one or more transition metals comprises zinc; and
    (d) injecting an effective amount of hydroxyphosphono acetic acid and/or salts thereof into said aqueous medium.

* * * * *